3,275,553
GREASE COMPOSITION
Joseph J. McGrath, Monroeville, and Chester S. Tempalski, Pittsburgh, Pa., assignors to Gulf Research & Development Company, Pittsburgh, Pa., a corporation of Delaware
No Drawing. Filed Oct. 1, 1964, Ser. No. 400,908
6 Claims. (Cl. 252—28)

This invention relates to an improved lubricating composition and more particularly to a lubricant having the consistency of a grease suitable for high temperature lubrication.

The trend in design of modern aircraft has accentuated the need for a lubricant having the consistency of a grease which will lubricate anti-friction bearings operating at high rotational speeds and high temperatures. Considerable progress has been made in recent years in producing improved thickened lubricants for aircraft. For example, lubricating compositions having the consistency of a grease are now available for lubricating bearings operating at 10,000 to 20,000 revolutions per minute at temperatures up to about 400° F. However, great difficulty has been encountered in producing a lubricating composition having the consistency of a grease which will effectively lubricate bearings operating at speeds of 10,000 to 20,000 revolutions per minute and at temperatures up to about 600° F. for prolonged periods of time.

Since many of the lubricating characteristics of a thickened lubricant are imparted to the lubricant by the lubricating oil used in preparing the lubricant, a lubricating oil is required which is thermally stable at temperatures in the order of 600° F. While some lubricating compositions having the consistency of a grease have been prepared by thickening mineral lubricating oils, especially hydrotreated mineral lubricating oils, the volatility of mineral lubricating oils is such that as a general rule they do not give adequate lubrication at temperatures in the order of 600° F. over prolonged periods of time. Synthetic oils are substantially more resistant to thermal degradation than mineral oils. Synthetic oils, particularly the polyorgano siloxanes known as the silicone oils in addition to being more resistant to thermal degradation than mineral oils also have high viscosity indices making their use at high and ambient temperatures especially desirable. Thus, the lubricating oil employed in the composition of this invention is a synthetic lubricating oil.

Even though the synthetic lubricating oils have given improved lubricants, some difficulty has been encountered in producing a thickened synthetic lubricating oil which will give adequate lubrication of bearings operating at temperatures of 600° F. and speeds up to 20,000 revolutions per minute over a prolonged period of time.

We have discovered that a lubricating composition having improved lubricating characteristics for an extended period of time when used to lubricate bearings operating at temperatures up to about 600° F. and speeds of 10,000 to 20,000 revolutions per minute can be obtained by incorporating into a synthetic lubricating oil, in oil thickening proportions, a polyazine having the following structural formula

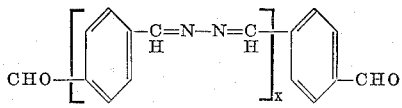

where $x$ is an integer having a value of 4 to 16, said polyazine prior to being incorporated into the oil having been heated to a temperature of about 450° to about 600° F. for a time sufficient to reduce the weight of the polyazine by about 40 to about 60 percent. Thus, the improved lubricating composition of our invention comprises a dispersion in a synthetic lubricating oil of a sufficient amount to thicken the lubricating oil to a grease consistency of "heat-treated" polyazine.

The polyazine which is heat-treated for use in the composition of the invention can be prepared by known chemical procedure. Neither the compound per se nor its method of preparation constitutes any portion of the invention. The polyazine, for example, can be prepared by reacting equimolar proportions of terephthalaldehyde and hydrazine sulfate. One suitable method for preparing the polyazine is described by C. S. Marvel and H. W. Hill, Jr., in the Journal of the American Chemical Society, volume 72, page 4819, October 1950. According to the procedure of C. S. Marvel and H. W. Hill, Jr., equimolar proportions of terephthalaldehyde, hydrazine sulfate and anhydrous sodium carbonate are refluxed in an aqueous ethanol solution until a solid yellow polyazine product precipitates from the solution. The polyazine product thus obtained melts above 425° C. and has a molecular weight within the range of 500 to 1000 as calculated from analytical data assuming aldehyde end-groups. The yellow polyazine product is insoluble in aqueous ethanol solutions and the more common organic solvents. Higher molecular weight polymers are obtainable if the reaction is conducted in the presence of a solvent such as dimethyl sulfoxide, dimethylacetamide and dimethylformamide. The polyazine useful in accordance with the present invention has a molecular weight within the range of about 500 to about 2000.

In order to stabilize the polyazine for use in compositions of the invention, the polyazine, prior to being incorporated in the oil, is heated to a temperature of about 450° to about 600° F. for a time sufficient to reduce its weight by about 40 to about 60 per cent. The heat-treated product thus obtained has a melting point above the polyazine prior to being heat-treated, the melting point of the heat-treated product being above about 450° C. The heat-treated product is a dark brown powder. While we do not wish to be limited to any theory with respect to what happens while heat-treating the polyazine, we believe that some polymerization may take place and/or that some of the lower molecular weight materials are driven off. Regardless of the theory with respect to what happens during the heat-treating step, we have found that in comparison with the untreated polyazine only about one-half as much of the heat-treated polyazine is required in a synthetic oil to give a composition having about the same dropping point and penetration values.

The polyazine used in the composition of our invention is preferably heated at a temperature of at least 450° F. While lower temperatures can be employed, the time required to reduce the weight of the polyazine by about 40 to about 60 percent becomes commercially unattractive. Temperatures above about 600° F. can be employed, but, unless effective agitation is employed, the product may become charred or otherwise rendered less desirable for use as an oil-thickening agent. The time required to effect a 40 to 60 percent reduction in the weight of the polyazine may vary from less than an hour to one hundred hours or more depending upon the efficiency of the heating method, the amount of polyazine being treated and the degree of agitation during the heating. In any event, we prefer to employ a temperature of about 450° to about 600° F. with agitation to effect a 40 to 60 percent reduction in weight in a minimum amount of time.

The amount of heat-treated polyazine which we use may vary depending upon the particular lubricating base employed and upon the characteristics desired in the ultimate composition. In any event, the amount of heat-treated polyazine used is an amount sufficient to thicken the lubricating oil to a grease consistency. In general this amount comprises about 10 to about 25 percent by weight of the total composition.

The synthetic lubricating oil which is employed in the composition of the invention is selected from the group consisting of the liquid polyorgano siloxanes having a high phenyl content and diphenylmethylsilyl end groups and polyaryl ethers. The polyorgano siloxanes can be obtained by hydrolyzing and polymerizing a mixture of diphenylmethylchlorosilane, dimethyldichlorosilane and diphenyldichlorosilane preferably in a ratio of 1:1:1, respectively, according to procedures known to those familiar with the art. While the polyorgano siloxanes are generally a mixture of polymers, a general formula representing the polymer mixture by an ideal molecule is as follows:

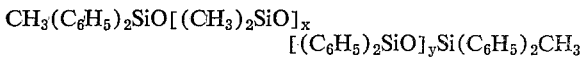

where $x$ and $y$ can be from 1 to 10 or more. An ideal molecule of a polyorgano siloxane having diphenylmethylsilyl end groups and a molecular weight of 954 is represented by the formula

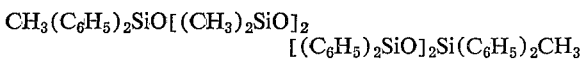

Exemplary of the polyaryl ethers which can be used are the polyphenyl ethers, i.e., m-bis(m-phenoxyphenoxy) benzene and m-bis(m-phenoxyphenoxy)phenyl ether.

The lubricating composition of this invention can contain conventional lubricant additives, if desired, to improve other specific properties of the lubricant without departing from the scope of the invention. Thus, the lubricating composition can contain an auxiliary thickening agent, a filler, a corrosion and rust inhibitor, an extreme pressure agent, an anti-oxidant, a metal deactivator, a dye and the like. Whether or not such additives are employed and the amounts thereof depend to a large extent upon the severity of the conditions to which the composition is subjected and upon the stability of the synthetic lubricating oil base in the first instance. Since the polyorgano siloxanes, for example, are in general more stable than mineral oils, they require the addition of very little, if any, oxidation inhibitor. When such conventional additives are used they are generally added in amounts between about 0.01 and about 5 percent by weight based on the weight of the total composition.

In those instances when an auxiliary thickening agent such as finely divided amorphous silica, bentonite-organic base compound or esterified siliceous solid is employed, it is added in amounts of about 0.5 to about 5 percent by weight.

In compounding a composition of the present invention, various mixing and blending procedures may be used. According to one embodiment of the invention, the synthetic lubricating oil, the heat-treated polyazine together with conventional lubricant additives, if desired, are mixed together at room temperature for a period of about 10 to 30 minutes to form a slurry. During this initial mixing period some thickening is evidenced. Some lumps may be formed. The slurry thus formed is then subjected to a conventional milling operation in a ball mill, a colloid mill, homogenizer or similar device used in compounding greases to give the desired degree of dispersion.

In order to illustrate the comparative grease-forming characteristics of polyazine and heat-treated polyazine, separate portions of a synthetic lubricating oil were thickened with polyazine and with heat-treated polyazine to give compositions having essentially the same penetration values and dropping points. The make-up of the compositions and their respective dropping points and penetration values are shown in Table I.

The lubricating oil used in preparing the lubricating compositions shown in Table I is a synthetic oil known as QF-6-7024 Fluid which is marketed by Dow-Corning Corporation. QF-6-7024 Fluid is considered to be a methylphenylsiloxane polymer wherein the "end" silicon atoms are substituted to a high degree by two phenyl groups and one methyl group. The material is highly resistant to radiation. QF-6-7024 Fluid has as typical characteristics a viscosity at 100° F. of about 930 to 1030 SUS, a viscosity at 210° F. of about 90 to 100 SUS, a viscosity index of about 108 to 110 and a pour point of +10° to +20° F. It is believed that the types of side chains present and their approximate molar percentages (in brackets) in QF-6-7024 are phenyl (65), methyl attached through silicon to methyl (25) and methyl attached through silicon to phenyl (10). An ideal molecule of a polyorgano siloxane having this analysis is as follows:

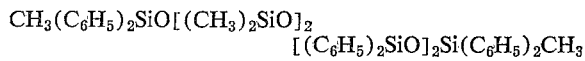

The procedure used in preparing the polyazine and the heat-treated polyazine used in the illustrative compositions was as follows: Into a flask equipped with a stirrer and a reflux condenser were placed 185 ml. of water, 315 ml. of 95% ethanol, 13 grams (0.1 mole) of hydrazine sulfate, 13.4 grams (0.1 mole) of terephthalaldehyde and 10.5 grams (0.1 mole) of anhydrous sodium carbonate. Almost immediately a yellow color appeared. The contents of the flask were then heated at reflux for about 2 hours. A yellow precipitate comprising the polyazine formed. After cooling, the yellow polyazine was filtered from the reaction mass, washed with water, then with ethanol and thereafter dried in an oven at 240° C. The polyazine product obtained in 95% yield, failed to melt up to 400° C. The product is considered to have a molecular weight in the range of about 500 to about 1,000 and a degree of polymerization within the range of 4 to 8. A portion of this product was set aside for comparative purposes. Ten grams of the polyazine product were placed in an open beaker and heated at 600° F. with continuous stirring for 24 hours. At the end of twenty-four hours, 4.6 to 5 grams of heat-treated polyazine were recovered. The weight loss corresponds to a reduction of about 50 to 54 percent. The heat-treated polyazine had the appearance of powdered coffee and a melting point above 450° C.

In preparing the comparative lubricating compositions, the oil and the polyazine or heat-treated polyazine were mixed at room temperature for a period of 10 to 30 minutes. The slurry thus formed was passed twice through a Premier Colloid Mill set at a stator-rotor clearance of 0.0015 inch. The approximate makeup and properties of thickened lubricating compositions thus prepared are set forth in Table I.

TABLE I

| Composition, Percent By Weight | A | B |
|---|---|---|
| Lubricating Oil QF-6-7024 | 75 | 86.75 |
| Polyazine | 25 | |
| Polyazine (Heat-treated) [1] | | 13.25 |
| Inspection: | | |
| Penetration D-1403: | | |
| Unworked (Conv. to D217) | 355 | 355 |
| Worked (Conv. to D217) | 347 | 343 |
| Dropping Point, °F | 700+ | 700+ |

[1] 24 hours at 600° F. with continuous stirring.

The data in Table I clearly illustrate the improved oil-thickening characteristics of the heat-treated polyazine in producing a composition having the consistency of a grease (Composition B). It will be noted that only about one-half as much of the heat-treated polyazine was required to give a composition having substantially the same dropping point and penetration values as Composition A.

Compositions having the consistency of a grease are readily prepared by incorporating about 10 to about 25 parts by weight of the heat-treated polyazine in about 90 to about 75 parts by weight of synthetic oil. The compositions thus obtained give good lubrication of bearings operating at temperatures of about 600° F. and about 20,000 revolutions per minute for prolonged periods of time. The performance life can be increased, however, if about 0.5 to about 5 parts by weight of an auxiliary thickening agent, such as finely divided amorphous silica, is employed in combination with the heat-treated polyazine.

In order to illustrate the improved performance life of a grease composition containing heat-treated polyazine and a finely divided amorphous silica in accordance with the invention comparative compositions were prepared and used to lubricate bearings operating at 600° F. and at rotational speeds of 20,000 revolutions per minute. The test results are shown in Table II. In these tests, Pope spindles were used in a test procedure similar to that outlined by the Coordinating Research Council Tentative Draft (July 1954), "Research Technique for the Determination of Performance Characteristics of Lubricating Grease in Antifriction Bearings at Elevated Temperatures," CRC Designation L–35. According to the CRC L–35 test method, the test bearings are packed with 3.5 cc. (or equivalent weight) of grease. Because of the extremely short life of bearings packed with 3.5 cc. of grease, the present evaluations were made by packing the bearings completely full with about 6 to 8 grams of grease and using either a standard end cap with no additional grease or a special end cap holding a reservoir of about 10 grams of additional grease. The bearing assembly containing an eight-ball SAE No. 204 ball bearing is mounted on a horizontal spindle and is subjected to a radial load of 5 pounds. The portion of the spindle upon which the test bearing assembly is located is encased in a thermostatically controlled oven. By this means the temperature of the bearing can be maintained at a desired elevated temperature which in the tests reported hereinafter was 600° F. The spindle is driven by a constant belt-tension motor drive assembly, capable of giving spindle speeds of 20,000 revolutions per minute. The spindle is operated on a cycling schedule consisting of a series of periods, each period consisting of 20 hours running time and 4 hours shutdown time. The test continues until the lubricant fails. The lubricant is considered to have failed when any one of the following conditions occurs, (1) spindle input power increases to a value approximately 300 percent above the steady state condition at the test temperature; (2) an increase in temperature at the test bearing of 20° F. over the test temperature during any portion of a cycle; or (3) the test bearing locks or the drive belt slips at the start or during the test cycle.

The "Cab-O-Sil" employed in preparing the compositions shown in Table II is a finely-divided amorphous silica marketed by Godfrey L. Cabot, Inc. This silica is a submicroscopic particulate silica prepared in a hot gaseous environment (1100° C.) by the vapor-phase hydrolysis of a silicon compound. On a moisture-free basis, this silica is 99.0 to 99.7 percent silicon dioxide which is practically free from contaminating metallic salts. Gravimetric analyses fail to detect the presence of any calcium or magnesium. The iron content has been found to be about 0.004 percent and volatile matter removed on ignition at 1000° C. amounts to less than 1 percent. "Cab-O-Sil" is an extremely fine silica with particles ranging in size from 0.015 to 0.020 micron.

In preparing the comparative lubricating compositions, the oil, the heat-treated polyazine and the silica when used were mixed at room temperature for a period of 10 to 30 minutes. The slurry thus formed was passed twice through a Premier Colloid Mill set at a stator-rotor clearance of 0.0015 inch. The make-up and properties of thickened lubricating compositions of the invention thus prepared are set forth in Table II.

TABLE II

| Composition, Percent By Weight | B | C | D |
|---|---|---|---|
| Lubricating Oil QF-6-7024 | 86.75 | 87.3 | 73.73 |
| Polyazine (heat-treated) [1] | 13.25 | 11.7 | 22.43 |
| Cab-O-Sil | | 1.0 | 3.84 |
| Inspection: | | | |
| Penetration D-1403 | | | |
| Unworked (Conv. to D217) | 355 | 355 | 332 |
| Worked (Conv. to D217) | 343 | 339 | 332 |
| Dropping Point, °F | 700+ | 700+ | 665 |
| Performance Life, Hours 20,000 r.p.m. at 600° F | 56 | 94 | 117 |

[1] 24 hours at 600° F. with continuous stirring.

The long performance life of compositions of the invention at a high rotational speed and a high temperature is self-evident from the above data. It will be noted that the addition of 1 percent by weight of finely divided silica greatly improves the performance life (Composition C) without significantly modifying the other properties of the lubricant. The addition of greater amounts of finely divided silica and heat-treated polyazine further improves the performance life (Composition D) but the composition has a lower dropping point and slightly lower penetration values. Notwithstanding the decrease in dropping point and lower penetration values, Composition D gives prolonged performance life in bearings operating at 600° F. and 20,000 revolutions per minute. The dropping point is important only in that the dropping point of the composition should be above the temperature at which the composition is to be used.

Other lubricating compositions within the scope of the invention are illustrated in Table III. The polyaryl ethers shown in Table III have the following typical characteristics.

| | (1) | (2) | (3) |
|---|---|---|---|
| Viscosity, SUS: | | | |
| At 100° F | 1,567 | 1,691 | 8,565 |
| At 210° F | 70 | 71 | 118 |
| Pour Point, °F | +35 | +40 | +70 |

(1) m-Bis(m-phenoxyphenoxy)benzene.
(2) Bis(phenoxyphenoxy)benzene (mixed isomers).
(3) Bis-m(m-phenoxyphenoxy)phenyl ether.

TABLE III

| Composition, Percent By Weight | E | F | G | H | I | J | K | L |
|---|---|---|---|---|---|---|---|---|
| Lubricating Oil: | | | | | | | | |
| OF-6-7024 | 85 | | | | | | 75 | |
| Polyaryl Ether: | | | | | | | | |
| m-Bis(m-phenoxyphenoxy) benzene | | 84 | | | 81 | | | 75 |
| Bis(phenoxyphenoxy)benzene (mixed isomers) | | | 83 | | | 80 | | |
| Bis-m(m-phenoxyphenoxy)phenyl ether | | | | 82 | | | | |
| Polyazine (heat-treated) [1] | 10 | 12 | 14 | 16 | 18 | 19.5 | 25 | 25 |
| Cab-O-Sil | 4 | 4 | 3 | 2 | 1 | 0.5 | | |

[1] 24 hours at 600° F. with continuous stirring.

While our invention has been described with reference to various specific examples and embodiments, it will be understood that the invention is not limited to such examples and embodiments and may be variously practiced within the scope of the claims hereinafter made.

We claim:

1. A lubricating composition comprising a dispersion in a major amount of a synthetic lubricating oil selected from the group consisting of liquid polyorgano siloxanes having diphenylmethylsilyl end groups and polyaryl ethers of a sufficient amount to thicken the lubricating oil to a grease consistency of a polyazine having the following structural formula

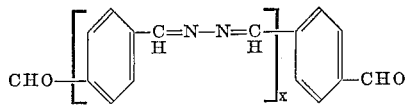

where $x$ is an integer having a value of 4 to 16, said polyazine prior to being incorporated into the oil having been heated to a temperature of about 450° to about 600° F. for a time sufficient to reduce the weight of the polyazine by about 40 to about 60 percent.

2. The lubricating composition of claim 1 wherein the heat-treated polyazine comprises about 10 to about 25 percent by weight of the total composition.

3. A lubricating composition comprising a dispersion in a major amount of a liquid polyorgano siloxane having diphenylmethylsilyl end groups of about 10 to about 25 percent by weight of a polyazine having the following structural formula

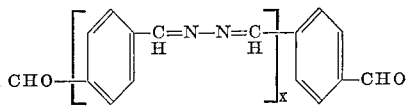

where $x$ is an integer having a value of 4 to 16, said polyazine prior to being incorporated into the liquid polyorgano siloxane having been heated to a temperature of about 450° to about 600° F. for a time sufficient to reduce the weight of the polyazine by about 40 to about 60 percent and about 0.5 to about 5 percent by weight of finely-divided silica.

4. A lubricating composition comprising a dispersion in a major amount of a liquid polyphenyl ether of about 10 to about 25 percent by weight of a polyazine having the following structural formula

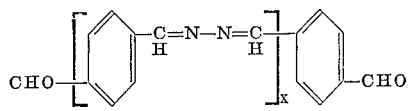

where $x$ is an integer having a value of 4 to 16, said polyazine prior to being incorporated into the liquid polyphenyl ether having been heated to a temperature of about 450° to about 600° F. for a time sufficient to reduce the weight of the polyazine by about 40 to about 60 percent and about 0.5 to about 5 percent by weight of finely-divided silica.

5. A lubricating composition comprising a dispersion in a major amount of a liquid polyorgano siloxane having diphenylmethylsilyl end groups of about 10 to about 25 percent by weight of a polyazine having a molecular weight within the range of about 500 to about 1000 and a structural formula of

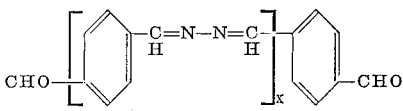

where $x$ is an integer having a value of 4 to 8, said polyazine prior to being incorporated into the liquid polyorgano siloxane having been heated at about 600° F. for a time sufficient to reduce the weight of the polyazine by about 50 to about 54 percent.

6. A lubricating composition comprising a dispersion in a major amount of a liquid polyorgano siloxane having diphenylmethylsilyl end groups of about 10 to about 25 percent by weight of a polyazine having a molecular weight within the range of about 500 to about 1000 and a structural formula of

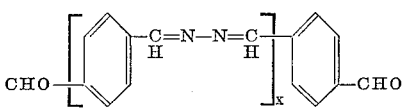

where $x$ is an integer having a value of 4 to 8, said polyazine prior to being incorporated into the liquid polyorgano siloxane having been heated at about 600° F. for a time sufficient to reduce the weight of the polyazine by about 50 to about 54 percent and about 0.5 to about 5 percent by weight of finely-divided silica.

References Cited by the Examiner
UNITED STATES PATENTS

| | | | |
|---|---|---|---|
| 2,710,839 | 6/1955 | Swakon et al. | 252—51.5 |
| 2,870,206 | 1/1959 | Meyer et al. | 260—566 |
| 3,153,089 | 10/1964 | Ameen | 260—566 |

DANIEL E. WYMAN, *Primary Examiner.*

I. VAUGHN, *Assistant Examiner.*